June 3, 1952 R. PORTE 2,599,282
COUPLING FOR CONNECTING TRAILERS TO POWER VEHICLES
Filed July 17, 1947 3 Sheets-Sheet 1
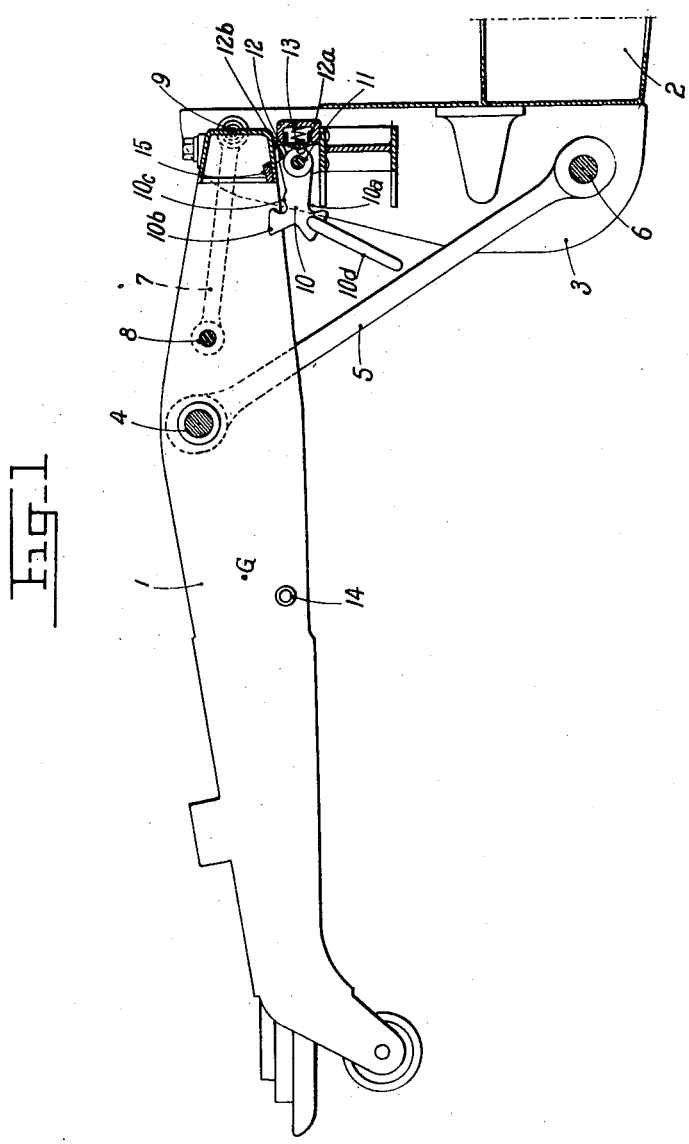
INVENTOR
RENÉ PORTE
BY
Robert E. Burns
ATTORNEY

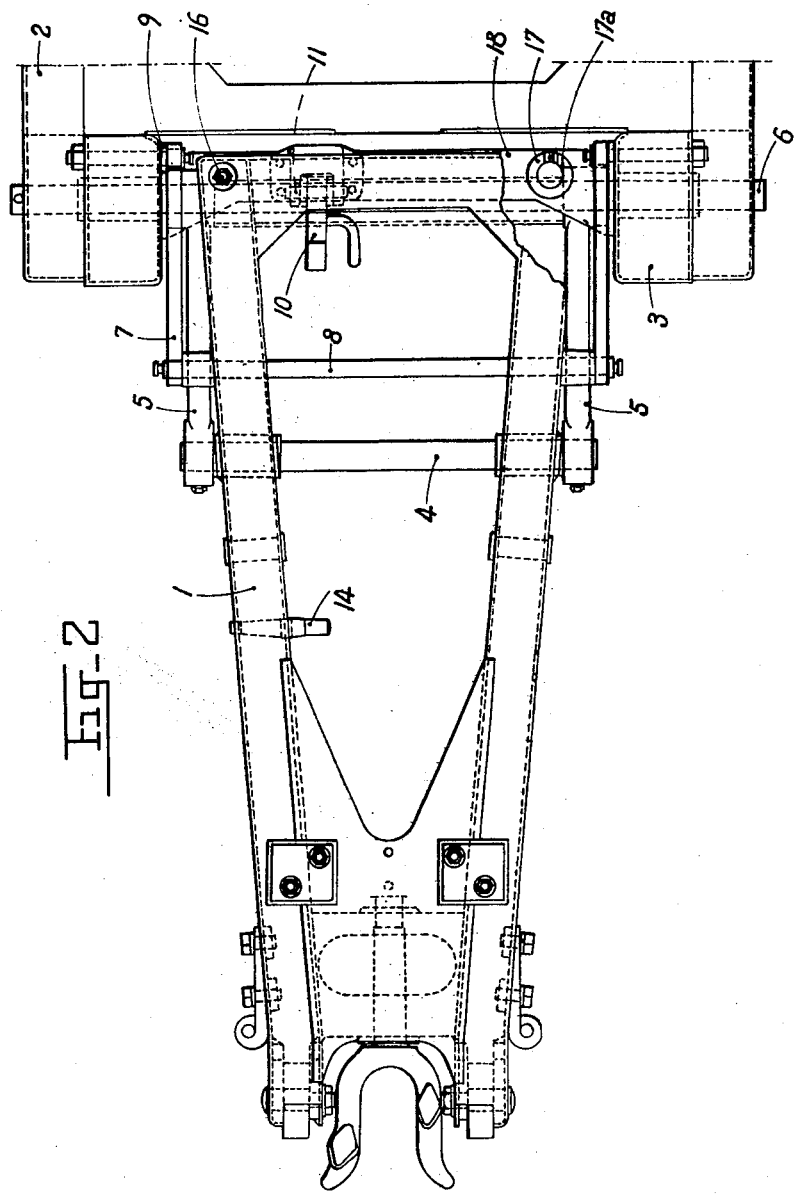

June 3, 1952 R. PORTE 2,599,282
COUPLING FOR CONNECTING TRAILERS TO POWER VEHICLES
Filed July 17, 1947 3 Sheets-Sheet 3
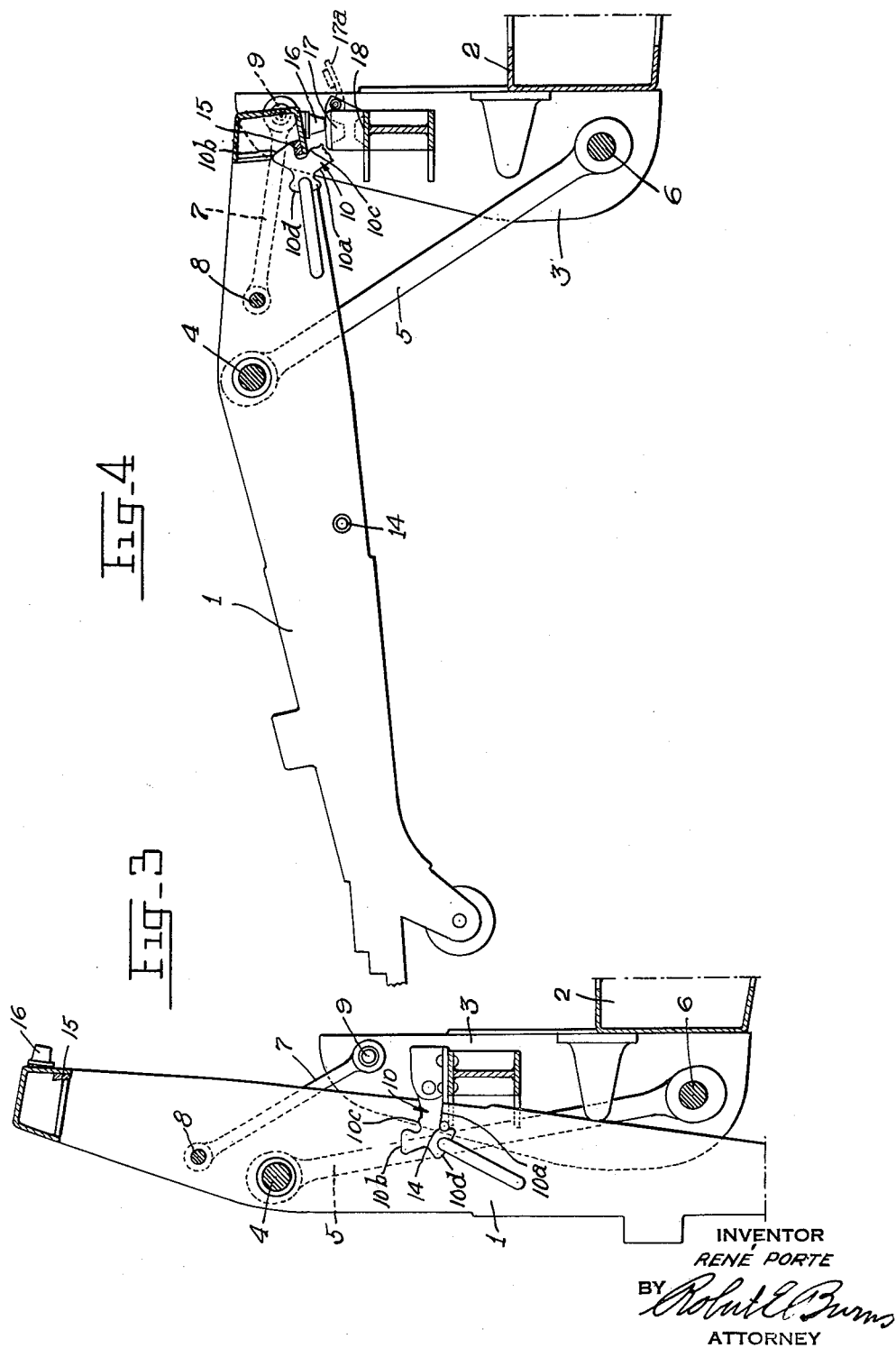
INVENTOR
RENÉ PORTE
BY
ATTORNEY Patented June 3, 1952

2,599,282

UNITED STATES PATENT OFFICE 2,599,282

COUPLING FOR CONNECTING TRAILERS TO POWER VEHICLES

René Porte, Paris, France, assignor to Societe Pour L'Union Des Transports Ferroviaires Et Routiers, Paris, France, a French corporation Application July 17, 1947, Serial No. 761,640
In France July 29, 1946

4 Claims. (Cl. 280—33.44)

This invention relates to towed vehicles, that is to say to vehicles intended to be coupled to another vehicle by means of a tow-bar, and it concerns more particularly, but not exclusively, road trailers, especially those intended to be detached from the tractor and transported by railway truck or by air craft.

It has already been proposed to link the tow-bar of vehicles of the type in question to an element, such for example as an arm articulated to the chassis of the said vehicles, which is arranged to take up a position in which it does not project substantially forwardly of the vehicle and in which the axis of articulation of the said tow-bar is displaced in the vertical direction, means being provided to ensure that the pivoting movement which the tow-bar tends to carry out under the force of gravity assists in ensuring, or even ensures completely, its own retraction and also that of the aforesaid element.

Such a coupling system will hereinafter be referred to as a "Coupling system comprising a retractable articulated tow-bar."

In the known systems of this type, the means for ensuring the retraction of the whole articulated arrangement are constituted by a deformable kinematic system, such as flexible straps, subjected to the action of control members supported by the tow-bar. This solution does not permit of obtaining a desmodromic control of the movement i. e. a positive guiding of the moving part during its entire course of movement of the aforesaid whole articulated arrangement and, moreover, it necessitates regulation of the length of the flexible straps.

The invention has for its principal object to provide towed vehicles equipped with a coupling system comprising a retractable articulated tow-bar which more satisfactorily fulfil practical requirements than those hitherto known.

It consists principally—while at the same time providing towed vehicles with a coupling system having a retractable articulated tow-bar—in forming by means of a desmodromic connection, preferably comprising connecting rods, the means intended to assist, and even to ensure completely, the retraction of the tow-bar when it tends to pivot about its axis of articulation under the force of gravity.

The invention consists, apart from this principal arrangement, in certain arrangements which are preferably simultaneously employed and to which reference will hereinafter be more fully made, in particular:

In a second arrangement, also relating to towed vehicles comprising a coupling system having a retractable articulated tow-bar, the said arrangement consisting in causing to cooperate with the said coupling system a securing device adapted to be brought into one of two positions, the first of which corresponds to the securing of the tow-bar in the retracted position and the second to the maintenance of the said tow-bar in a preparatory position adjacent to the position of use, the change-over from the said preparatory position to the said position of use being effected during the coupling operation, by the action of an inclined face or the like provided on the traction vehicle and having the effect of causing the securing device to return into its initial position;

And a third arrangement, relating to coupling systems of which the tow-bar is brought from a preparatory position into a position of use during the recoil of the traction vehicle, the said arrangement consisting in providing means by which the user can prevent or limit at will this complementary movement of the said tow-bar.

The invention concerns more particularly a certain method of application (that in which it is applied to road trailers intended to be transported by truck or by aircraft) and certain forms of embodiment of the aforesaid arrangement, and it concerns more particularly still, by way of new industrial products, the vehicles of the type in question in which the same arrangements are embodied and the special elements suitable for their construction.

The invention will in any case be readily understood from the following further description, and from the accompanying drawings, which further description and drawings are naturally given principally by way of example.

Figures 1 and 2 of these drawings are a sectional elevation and a fragmentary plan view (in the position of use) respectively, of the forward part of a road trailer constructed in accordance with the invention, and Figures 3 and 4 are sectional elevations of the forward parts of the said trailer in the retracted position and in the preparatory position respectively.

According to the invention, the trailer considered as a whole and without the tow-bar 1 with which it is to be provided, may be constructed in any appropriate usual manner, for example in such a manner that it comprises a chassis 2 terminated in the forward direction by a swan-neck 3 and supported, for example, on a single axle or bogie situated at the rear, the trailer then being of the "semi-trailer" type.

Referring now to the tow-bar 1, it is so arranged that it constitutes a coupling system of the type comprising a retractable articulated tow-bar as hereinbefore defined. For this purpose, for example, the tow-bar 1 is articulated by means of a pin 4, at the extremity of two supporting connecting rods 5 disposed on either side of the said tow-bar and themselves articulated at their other extremities by means of a pin 6 secured to the base of the swan-neck 3, the said connecting rods being adopted to be lifted against the said swan-neck, thus ensuring the lifting of the link pin 4 of the tow-bar 1. In addition, the link pin 4 is positioned between the centre of gravity G of the tow-bar 1 and that extremity of the tow-bar which is situated on the side nearer the swan-neck 3, so that the force of gravity tends to cause the said tow-bar, which is assumed to be free, to pivot in such a manner that its forward part moves nearer to the ground.

Means are also provided for assisting, or even completely ensuring, the retraction of the tow-bar tends to pivot about the link pin 4 under the force of gravity.

In accordance with the principal arrangement of the invention, these means are constituted by a desmodromic connection situated between the tow-bar 1 and a fixed part of the trailer.

In the form of embodiment of the invention illustrated in the drawings, this connection is effected by coupling the rear part of the tow-bar 1 to the swan-neck 3 by means of two auxiliary connection rods 7, the link pins 8 and 9 of which are so disposed that when the tow-bar descends under the action of gravity by pivoting about the pin 4 the said auxiliary connecting rods cause the said tow-bar to be retracted against the swan-neck 3 (position shown in Figure 3).

In this way, the tow-bar 1 will be maintained and guided positively both in the lowering movement and in the lifting movement, for all the intermediate position which it successively occupies between its retracted position and its position use. In addition, at the end of the movement of retraction, the connecting rods 7 prevent any undesired pivoting of the tow-bar 1, for example as a result of an accidental shock.

Furthermore, the articulated system constituted by the tow-bar 1, the supporting connecting rods 5 and the auxiliary connecting rods 7 will be practically proof against faulty adjustment owing to the fact that it only comprises rigid elements. The aforesaid tow-bar will therefore never fail to occupy exactly the same characteristic positions (retracted position, preparatory position and position of use), whereby the manipulations for the purpose of coupling and parking are facilitated.

Although it is sufficient to proceed as hereinbefore described, it appears to be preferable, according to another arrangement of the invention which is independent of that precedingly described with a securing device, such for example as a double hook 10 adapted to be brought into one of two positions, the first of which corresponds to the securing of the tow-bar 1 in the retracted position (shown in Figure 3), while the second corresponds to the maintenance of the said tow-bar in the preparatory position (shown in Figure 4), the change-over from the said preparatory position to the said position of use being effected during the coupling operation by the action of an inclined face or the like provided on the traction vehicle, and having the effect of causing the double hook 10 to return into its initial position.

The drawings show a form of embodiment for this purpose, in which the double hook 10 is articulated about a pin 11 supported by the upper part of the swan-neck 3. A double cam 12 rotating in unison with the hook 10 is provided, with which there co-operates a spring catch 13 or the like adapted to maintain the said hook temporarily, in a resilient manner, in one of two positions (upper position shown in Figure 4 and lower position shown in Figures 1 and 3). As shown in Fig. 4, the cam 12 has two notches which receive the spring catch 13 when the hook 10 is at either of its two positions. The double cam 12 is so called because it has two notches 12a and 12b which are adapted to receive the spring catch when the hook 10 is in either of its two operative positions, the catch 13 serving to hold the hook in the position selected. In Fig. 1 the hook 10 is shown in its lower position and the spring catch 13 is shown engaging the notch 12a in cam 12 which corresponds to the lower position of the hook 10. When the hook 10 is moved to its upper position, as by lifting handle 10d (Fig. 4) the upper notch 12b of cam 12 (Fig. 1) will engage spring catch 13. The hook 10 has a notch 10a adapted to co-operate, when the tow-bar 1 is retracted, with a catch pin 14 suitably situated on the said tow-bar, and on the other hand a projection 10b adapted to bear, when the tow-bar has reached its preparatory position, on a catch stud 15 provided on the said tow-bar, which has the effect of maintaining the whole coupling system in this position.

In that part of the hook 10 which is situated immediately below the projection 10b there is provided a reversing boss 10c adapted to ensure, when it is acted on by the stud 15 (during the change-over of the tow-bar 1 from the preparatory position to the position of use), the return of the aforesaid hook from its upper position to its lower position. The boss 10c is in the nature of a projection on the side of hook 10. When hook 10 is in its elevated or preparatory position (Fig. 4) the stud 15 makes contact with boss 10c. The double hook 10 is also provided with an operating member, for example a lever 10d.

The operation of this securing device is as follows:

It will be assumed that the tow-bar 1 is retracted (position shown in Figure 3). The notch 10a co-operates with the pin 14 and locks the whole coupling system in this position. When the user wishes to couple the trailer, he commences by lifting the hook 10, which then takes up the position shown in Figure 4. The tow-bar is free and the user can lift it until it reaches the preparatory position (Figure 4). At the end of this movement, the stud 15 produces a slight retraction of the projection 10b against the action of the spring catch 13, and then becomes engaged below the said projection, which has the effect of retaining the tow-bar 1 in this preparatory position, so that it can be momentarily abandoned. From this moment, it is sufficient to carry out the actual coupling operation in order to cause the tow-bar to change over from its preparatory position to its position of use (shown in Figure 1). In fact, the recoil of the tractor towards the trailer causes, owing to the action of an inclined face or the like on the forward extremity of the tow-bar 1, a complementary lifting of the tow-bar, which then takes up its position of use, the stud 15 ensuring during this complementary lifting, by its action on the reversing boss 10c, the return of the hook 10 into the lower position. In the preparatory position the outer end of the tow-bar 1 is disposed somewhat below the horizontal position in which it will be held when attached to the tractor. Thus when the free end of the tow-bar 1 is raised by the tractor during the hitching operation, the stud 15 exerts substantial pressure on the boss 10c. This pressure disengages the hook 10 and allows it to pivot by gravity to its lower position (Fig. 1) whereupon notch 12a engages spring catch 13. The hook 10 is then in position to receive the catch pin 14 when the tow-bar is uncoupled and retracts itself (Fig. 3). If the trailer is then uncoupled, the tow-bar 1, which is no longer secured, freely descends under the action of gravity and the catch pin 14, after having caused the hook 10 to rise slightly against the action of the spring catch 13, again becomes engaged in the notch 10a, thus securing the whole coupling system in the retracted position.

It is to be noted that the uncoupling of the trailer and the retraction of the tow-bar 1 take place without its being necessary to manipulate the hook 10 in any manner during the advance of the tractor. Consequently, the risks of an accident (in particular falling of the tow-bar on the legs of the user) are completely eliminated.

Finally, the aforesaid coupling system can advantageously be completed by means enabling the user to limit, or even to prevent completely, the movement of the tow-bar 1 from its preparatory position to its position of use, as will hereinafter be assumed.

In this way, the recoil of the tractor will have the effect, not of causing the tow-bar 1 to pivot through a further angle about its link pin 4, but of causing a lifting of the entire forward part of the trailer, which then pivots about its rear axle. Such a manipulation may be particularly desirable in the case of tank trailers, the container of which can be emptied more rapidly and more completely.

For this purpose, the aforesaid means may be constituted, for example, by providing on the lower face of the rear extremity of the tow-bar 1, conical stops or the like 16, for example two in number, which are adapted to become engaged during the change over of the aforesaid tow-bar from its preparatory position to its position of use, in conical sockets 17 supported by a cross member 18 integral with the swan-neck 3, and by providing each socket 17 with a retractable cover 17a, which, when retracted, is adapted to prevent the engagement of a corresponding conical stop in the said socket. Thus in normal operation when the tow-bar 1 is raised by the tractor during the hitching operation, conical stops 16 slide into conical sockets 17. When, however, it is desired to draw the tractor in a rearwardly inclined position rather than substantially horizontal, which is desirable in the case of tank trailers to permit a more complete emptying of the tank, the stops 16 are prevented from entering sockets 17. For this purpose the retractible covers 17a are placed over the sockets 17.

Thus when the trailer is joined to the tractor, the upward lifting motion by the tractor is not absorbed by the slipping of stops 16 into sockets 17 but rather the entire trailer is tilted about its wheel axle as a pivot thereby inclining the trailer slightly to the rear.

As will be seen from the foregoing description, the invention is naturally in no way limited to the method of application or to the constructional forms of its various parts which have been more particularly referred to, but covers all variations thereof.

I claim:

1. A coupling apparatus for connecting a trailer to a power vehicle comprising a tow bar articulately connected to the trailer by two connecting links, one of said links being articulated to the trailer and articulated to the tow bar at a point rearward of the center of gravity of the bar whereby the forward end of the tow bar will pivot downwardly about the said link under the influence of gravity, the other of said links being articulated to the trailer at a point above the point of articulation of the first-named link and to the tow bar at a point rearward of the point of articulation of the first-named link, whereby said second-named link will raise the rearward end of the tow bar when its forward end pivots downwardly about the first-named link to bring the tow bar into substantially vertical position against the trailer.

2. A coupling apparatus as defined in claim 1 further comprising means for securing said tow bar in retracted vertical position against the trailer and for securing said tow bar in substantially horizontal position.

3. A coupling apparatus as defined in claim 2 wherein said securing means comprises a pivoted hook having two catch means, one of said catch means being engageable with a first spur on said tow bar and the second of said catch means being engageable with a second spur on said tow bar, said tow bar carrying means for disengaging said second-named hook means for said second-named spur when the forward end of said tow bar is raised above a predetermined vertical level.

4. A coupling apparatus according to claim 1 wherein said tow bar is provided with stops on the lower face of the rear extremity thereof, sockets adapted to receive said stops in a cross member integrally connected to the chassis of the towed vehicle, said sockets being provided with removable covers, said covers being adapted when in position over said sockets, to prevent penetration of said stops into said sockets.

RENÉ PORTE.

REFERENCES CITED

The following references are of record in the file of this patent:

UNITED STATES PATENTS

| Number | Name | Date |
|---|---|---|
| 717,752 | Koegel | Jan. 6, 1903 |
| 1,213,938 | Norton | Jan. 30, 1917 |
| 1,677,618 | Clement | July 17, 1928 |
| 2,136,834 | Baird | Nov. 15, 1938 |
| 2,370,866 | Lewis | Mar. 6, 1945 |

FOREIGN PATENTS

| Number | Country | Date |
|---|---|---|
| 191,380 | Switzerland | June 15, 1937 |